March 3, 1953     J. H. KANDEL     2,630,155

VEHICLE ANTISKID DEVICE

Filed Feb. 10, 1948

Joseph H. Kandel,

By: Homer R. Montague

Patented Mar. 3, 1953

2,630,155

UNITED STATES PATENT OFFICE 2,630,155

VEHICLE ANTISKID DEVICE

Joseph H. Kandel, Washington, D. C.

Application February 10, 1948, Serial No. 7,321

4 Claims. (Cl. 152—236)

This invention relates to the operation of vehicles and more particularly to an improved antiskid means for the resilient tires of motor vehicles and the like.

It is an object of the invention to provide an anti-skid cross chain or the like adapted to be secured about the tire, and to a portion of the rim, of a vehicle driving wheel, and which shall incorporate a novel form of holding means, whereby the application of such chains is greatly speeded up and facilitated.

It is a further object of the invention to provide a securing means for such anti-skid devices designed for cooperation with a known hand and standard form of tire rim in such a way that a major portion of the force necessary to prevent accidental dislodgement of the chain is provided by the configuration of the rim and the securing means.

Still another object of the invention is to provide a device of the kind mentioned in which the anti-skid chain or the like is secured to opposite edges of peripheral portions of a usual tire rim, rather than by passing completely around the cross-section of the tire and rim. Such an arrangement not only eliminates a large part of the work involved in applying known types of anti-skid chains, but permits my improved chain or anti-skid element to be applied to tires and wheels having solid centers, and with which the threaded-through type of anti-skid chains of the prior art could not be employed.

A more particular object of the invention is to provide an anti-skid chain or the like in which a magnetic element at each end thereof is utilized to retain the device in inter-locking relationship to the rim, whereby the magnetic holding devices are required only to exert a minimum of holding effort, the actual retaining force necessary to keep the chain in place against the action of centrifugal force or sudden shocks and jars, being absorbed by the interlocking configuration of said magnetic elements and the edge of the wheel rim.

Figure 1:
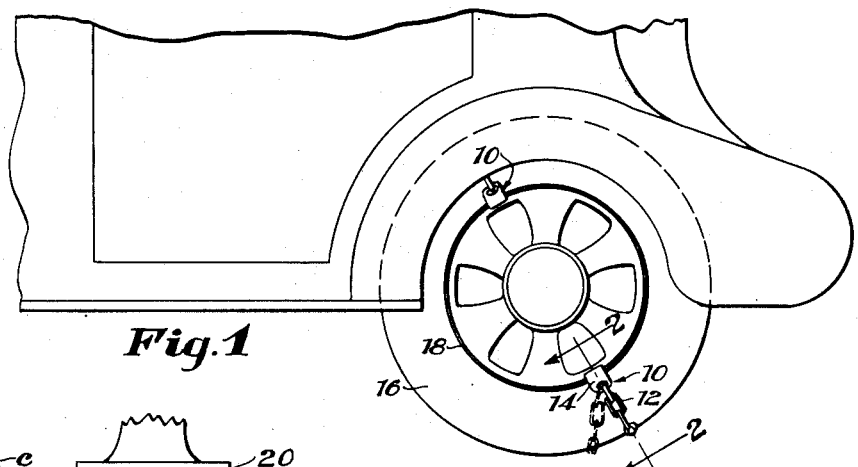
Figure 2:
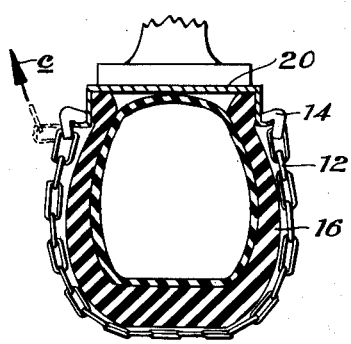
Figure 3:
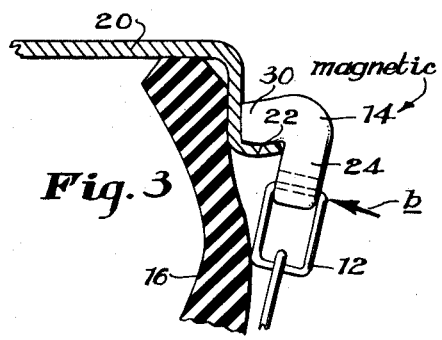
Figure 4:
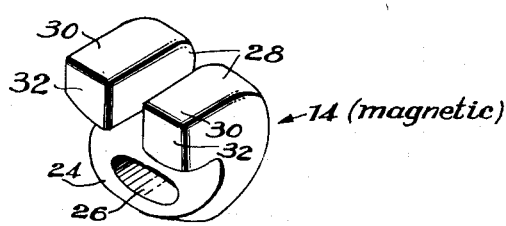
Figure 5:
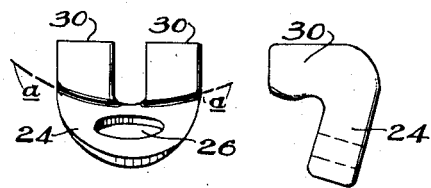
Figure 6:
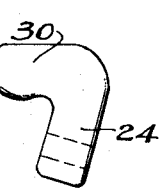

The above and other objects and advantages of my invention will best be understood by reference to the following detailed specification of a preferred embodiment thereof, taken in connection with the accompanying drawings, in which:

Fig. 1 is a fragmentary side elevation of a wheeled vehicle employing my invention, Fig. 2 is a sectional view taken on line 2—2 of Fig. 1, Fig. 3 is a fragmentary view, to an enlarged scale, of a portion of Fig. 2, Fig. 4 is a perspective view of a preferred form of chain securing device, Fig. 5 is a front elevation thereof, and Fig. 6 is a side elevation thereof.

In the field of motor vehicles, it is well known that in inclement weather, and particularly where travel is intended over roads or streets covered with snow or ice, the traction between wheels and pavement may be considerably increased by the use of so-called tire chains or the like, secured to each of the driving wheels of the vehicle. However, the use of such devices has always entailed considerable annoyance in that chains of this type are inconvenient to apply to the wheels, and once applied, are difficult also to remove. Thus, where the weather or surface conditions are changeable, the applying and removal of conventional tire chains has put these devices in the category of a necessary evil.

In order to simplify the application of anti-skid devices, there have also been utilized single cross-chains, adapted to pass around the cross-section of a tire and through the wheel, as between spokes, the ends of such chains being secured to one another to hold the devices in place. However, while this has resulted in some simplification, it is still necessary with such devices to remove and replace them from time to time as conditions require, and the labor of locating the connector portion and disconnecting the ends from one another (particularly where the cross-chain joint is found to be behind or inside of the tire) is very objectionable.

Both of the above solutions to the anti-skid problem are such sources of annoyance that the value of these devices from the view-point of traffic safety is reduced, because the devices are naturally relegated to the category of emergency measures, and a particular driver's judgment as to whether anti-skid measures are required is therefore colored by his knowledge of the difficulties and annoyance involved in applying the chains. Any device, therefore, which will make an effective anti-skid chain easier to replace and remove, offers a very real contribution to traffic safety.

In accordance with my invention, the application of anti-skid cross-chains is accomplished without the necessity of getting under the car or behind the driving wheels, and my cross-chains can be applied and removed so easily that there is little incentive to dispense with their use on the ground of inconvenience. Moreover, my construction is relatively simple and economical to produce by known methods, so that a sufficient quantity of the anti-skid chains may readily be obtained without involving an unreasonable outlay.

Referring now to the drawings, Fig. 1 illustrates the application to a rubber-tired vehicle of a pair of my improved anti-skid chains generally indicated by numeral 10, each comprising a cross-chain or the like 12 terminating at each end in a hook-shaped, double armed magnetic element 14. The vehicle tire is designated by numeral 16, and is mounted in a known manner upon a rim 18 (Fig. 2) provided with a wide, central channel portion 20 to receive the tire, and a flange 22 extending laterally from each leg of the channel. This flange, in the standard form of rim, is slightly cupped as best shown in Fig. 3, and I shape the hook portions of my magnetic securing elements to cooperate with this flange in a manner now to be described.

As best shown in Figs. 4 to 6 of the drawings, the magnetic securing elements of my invention each comprise a permanent magnet which may be thought of as a horse-shoe magnet whose tips are bent at approximately a right angle to the plane of the horse-shoe, thus forming combined hooks and magnetic poles. In the drawings, numeral 14 designates a securing element whose body portion 24 is formed with an aperture 26 adapted to receive an end link of the cross-chain, and extends upwardly in a pair of spaced arm portions 28 which terminate in forwardly-turned fingers 30 between which is the air-gap of the magnetic circuit. As shown in Figs. 3 and 6, the under surfaces of the fingers 30 are made slightly convex downward to conform to the cupping of the flange 22 of rim 18. Looking at Fig. 5, the under surfaces of these fingers are also preferably curved to conform to the dash line arc $a, a$ which is of the same curvature as the periphery of rim 18, so that a maximum area of contact between the fingers 30 and flange 22 is assured. The vertical surfaces 32 of the fingers are preferably ground or otherwise formed so as to engage closely the outer surface of the rim flange 2, which is shown as flat in accordance with the present standard rim for automobiles.

It is clear from the above description and drawings that there is a definite physical interlocking of the fingers 30 and the rim flange 22, whereby removal of the securing elements, except intentionally, is inhibited. For example, the centrifugal force developed when the wheel is rotated is completely nullified as a force in removal of the cross-chains, as is the force resulting from any temporary distention of the tire profile due to passage over bumps or imperfections in the travelled surface. Inasmuch as the flexible chain 12 is incapable of transmitting any compressive force, the chance of dislodgment of the elements 14 in a direction counter to the centrifugal force (that is, radially of the wheel) is also minimized. Moreover, there is no danger that the cross chain and its securing elements 14 will be permitted to slide about the circumference of the tire and rim, because of the fact that the chain itself is inextensible, so that it could only with the greatest difficulty be forced into the dotted line position of Fig. 1, for example, which is necessary for the transmittal of any circumferential pull upon the elements 14.

The magnetic elements can economically be formed of cast or molded magnetic material of the class known as "Alnico" or equivalent, in order to provide a maximum holding power between elements 14 and the iron or steel rim 18. Where the air gap in the magnetic circuit is zero, as here, a holding force of many pounds may be obtained with magnetic elements 14 of a convenient size and weight, and this force is entirely adequate, when properly applied as in the present design, to ensure against accidental removal or loss of the cross chains.

When it is desired to remove the chains, this may be accomplished conveniently by directing strong blow or kick upon the outer surface of the body portion of that element 14 on the outer face of the tire, as indicated by arrow $b$ in Fig. 3. This pivots the entire element 14 about the outermost edge of the flange 22, and effectively separating this element from the rim. The inner securing element may then be dislodged by a strong pull upon the chain 12 preferably in a direction toward the axle of the wheel, as indicated by the arrow $c$ and dotted chain links in Fig. 2. If it is anticipated that the chains will be needed again in a short time, instead of placing them in the car or tool compartment, both ends of the chain may be secured to the rim flange on the outer face of the wheel, in which position the magnetic elements will hold the chains ready for re-application when needed. Rattling of the chains in this position will be prevented if the magnetic elements are snapped onto the rim flange at points sufficiently far apart to make the chain portion tight.

Since it is desirable that the cross-chain 12 in each case be maintained in a relatively tight condition, both to prevent unnecessary noise and to eliminate slippage of the chain around the periphery of the tire (the geometry of which has been referred to above), the length of the chain connecting the two securing elements 14 should be chosen in accordance with the tire size to be fitted. This may be accomplished either by providing a range of sizes of the complete device (two or three different sizes will cover the requirements of all standard passenger cars), or the length of the chain may be adjusted by adding or subtracting links from the chains. While the above description refers generally to "chains" as the anti-skid elements, it will be obvious that leather or rubber straps or any equivalent material having anti-skid properties may be employed.

I have found that the use of a single chain per driving wheel, or better a pair of such chains spaced equally about the wheel, is sufficient to enable operation of the vehicle under ordinary conditions of winter driving or ice and snow, although more may of course be utilized per wheel if conditions warrant.

I have described and illustrated herein a preferred embodiment of my invention in accordance with the patent laws, but numerous changes and modifications therein can be made without departing from the spirit of the invention as defined by the appended claims.

I claim:

1. An anti-skid device for vehicle wheels comprising a length of material having anti-skid properties, and a U-shaped permanent magnet fastener at each end of said length, each leg of said U-shaped fastener terminating in a hook-like portion extending laterally from the direction of said leg, the under surface of each such hook-like portion being curved in two directions at right angles to one another.

2. An anti-skid device for the wheels of vehicles, and adapted to be held secure to said vehicle wheels by both magnetic and centrifugal forces, comprising a length of flexible but inextensible material having anti-skid properties, said length being dimensioned to extend closely about the cross-sectional periphery of a vehicle tire and terminating adjacent the opposed flanges of the rim supporting said tire, and a permanent magnet of hook-like configuration loosely secured to each end of said length for engagement with one of said flanges.

3. An anti-skid device for the tires of vehicles which tires are mounted upon rims having opposed flanges, said device being adapted to be held secure to said rims by both magnetic and centrifugal forces, comprising a length of material having anti-skid properties, and a hook-like fastener at each end of said length for engagement with said opposed flanges, said hook-like fasteners conforming in part with the configuration of said rim flanges so as to grip them mechanically, and said fasteners being formed of permanent magnet material whereby said fasteners are held to said rim flanges both mechanically and magnetically.

4. A securing element for anti-skid chains of the type which are adapted to encompass a tire mounted on a wheel having a curved rim flange and adapted to be held secure to said flange by both magnetic and centrifugal forces, comprising a permanent magnet body portion, a pair of spaced leg portions, said leg portions extending from said body portion in the same general direction, and a hook-like projection extending laterally from each of said leg portions, the under surface of each projection being curved in two directions to conform to the curvature of a wheel rim flange, whereby to provide a maximum area of contact and maximum magnetic attraction between said securing element and flange.

JOSEPH H. KANDEL.

REFERENCES CITED

The following references are of record in the file of this patent:

UNITED STATES PATENTS

| Number | Name | Date |
|---|---|---|
| 389,037 | Wilkinson | Sept. 4, 1888 |
| 1,390,893 | Elliott | Sept. 13, 1921 |
| 1,932,143 | Piercy | Oct. 24, 1933 |
| 2,308,904 | Wood | Jan. 19, 1943 |